INVENTOR
UMEO NAKANO

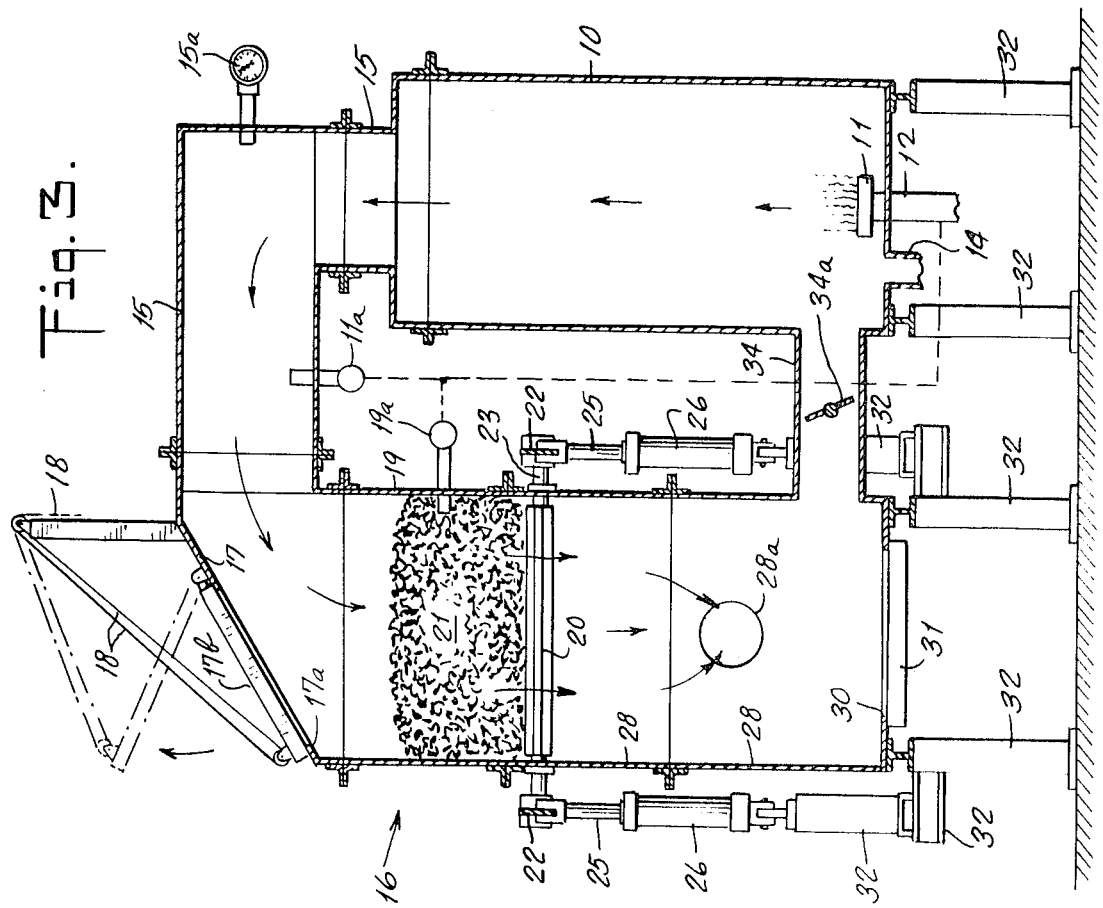
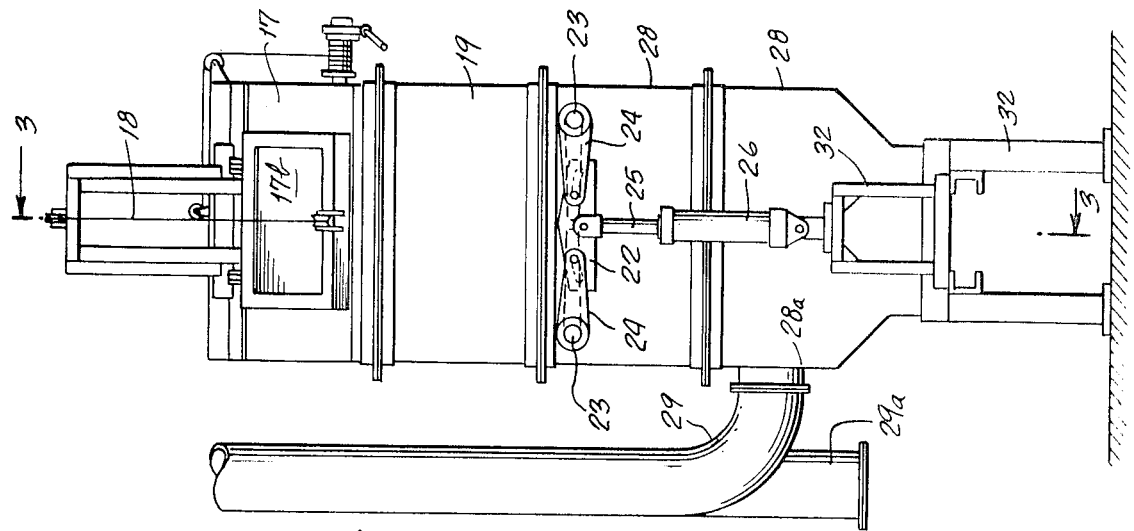

United States Patent Office 3,627,486
Patented Dec. 14, 1971

3,627,486
PROCESS FOR REMOVING SELENIUM VALUES
Umeo Nakano, Montreal, Quebec, Canada, assignor to Canadian Copper Refiners Limited, Toronto, Ontario, Canada
Filed Apr. 1, 1969, Ser. No. 811,907
Int. Cl. C01b 19/00
U.S. Cl. 23—139       5 Claims

ABSTRACT OF THE DISCLOSURE

In an operation wherein selenium values are recovered from pelletized selenium-containing materials involving heating pelletized selenium-containing materials in the presence of air so as to volatilize the selenium from said pelletized selenium-containing materials in the form of selenium dioxide, improved results are obtained by employing an apparatus wherein a mass of pelletized selenium-containing material is maintained static within a roasting zone and preheated air employed to heat the mass of pelletized selenium-containing materials is passed downwardly through said mass of pelletized selenium-containing materials maintained at a temperature of about 1350° F. for a period of time in the range about 1–6 hours sufficient to volatilize substantially all of the selenium from said pelletized selenium-containing materials and thereupon discharging the resulting substantially deselenized pelletized material from said roasting zone.

---

This invention is concerned with recovery of selenium values from selenium-containing materials, such as copper anode slimes, muds, sludges, dusts and the like. More particularly, this invention is directed to the recovery of selenium in the form of selenium dioxide from selenium-containing tank house slimes resulting from the electrolytic refining of copper. In one embodiment this invention is directed to a process and apparatus for the recovery of selenium in the form of selenium dioxide from decopperized tank house slimes, i.e. slimes from which a substantial amount of the copper has been removed, resulting from the electrolytic refining of copper.

Various processes and apparatus are known for the recovery of selenium in the form of selenium dioxide from selenium-containing materials, such as tank house slimes, see particularly U.S. Pat. 2,948,591 and Canadian Pat. 588,098. For the most part, however, the processes and apparatus known heretofore have not been completely satisfactory, particularly from the point of view of ease of operation and process and apparatus simplicity and productivity.

It is an object of this invention to provide an improved process and apparatus for the recovery of selenium values from pelletized selenium-containing materials, particularly pelletized decopperized tank house slimes.

It is another object of this invention to provide a process and apparatus having increased productivity for the recovery of selenium values from pelletized selenium-containing materials.

How these and other objects of this invention are achieved will become apparent in the light of the accompanying disclosure made with reference to the accompanying drawings wherein:

FIG. 2 is a side view of an apparatus useful in accordance with this invention for the recovery of selenium values from pelletized decopperized selenium-containing slimes; and wherein FIG. 3 is a cross sectional view of the apparatus of FIG. 2 taken in the direction of arrows 3—3.

Figure 1:
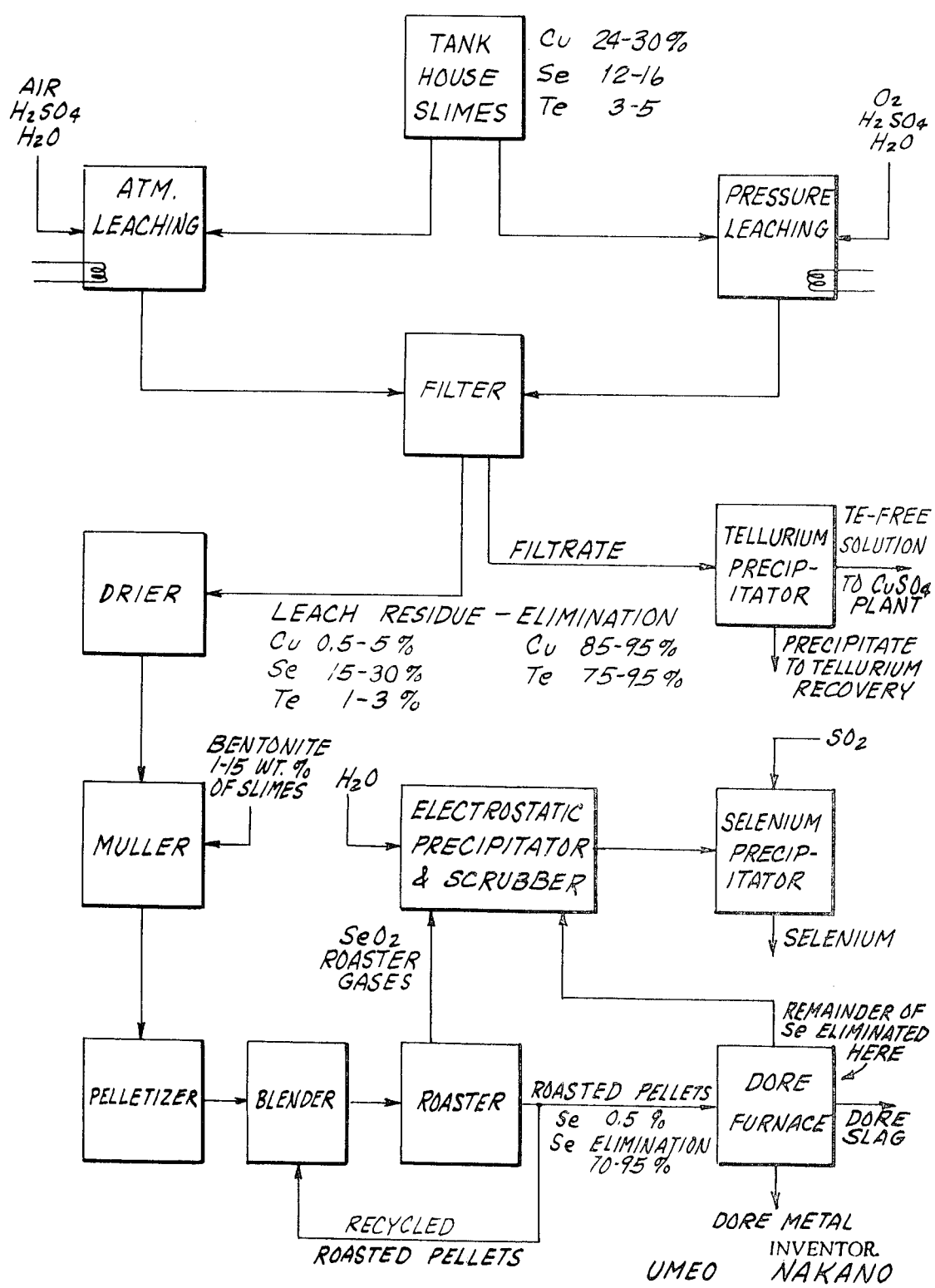
FIG. 1 is a flow chart outlining the practice of this invention as applied to the recovery of selenium from pelletized selenium-containing tank house slimes.

In at least one embodiment of this invention at least one of the foregoing objects will be achieved.

It has been discovered that improved results are obtained in a process and apparatus useful for the recovery of selenium values from pelletized selenium-containing materials, such as pelletized selenium-bearing tank house slimes, by forming a static mass of pelletized selenium-containing materials within a roasting zone and heating the mass of pelletized selenium-containing materials to a suitable elevated temperature, preferably by contact with a preheated gas, such as air or other suitable oxygen-containing gas, so as to volatilize the selenium contained in said pelletized selenium-containing materials, such as to volatilize the selenium as selenium dioxide, maintaining said mass of pelletized selenium-containing materials static relative to and within said roasting zone and moving a hot oxygen-containing gas, such as preheated air, therethrough while maintaining the static mass of pelletized selenium-containing materials at a suitable elevated temperature, such as a temperature in the range 1300–1400° F., e.g. about 1350° F., for a period of time sufficient to volatilize therefrom a substantial amount, preferably substantially all, of the selenium for eventual treatment and recovery.

Reference is now made to FIG. 1 which shows a flow chart illustrative of the practice of this invention as applied to the recovery of selenium values from selenium-containing tank house slimes resulting from the electrolytic refining of copper. The selenium-containing slimes having a selenium content in the range 10–30% by weight or, as indicated in FIG. 1, a selenium content in the range 12–16% by weight, are treated by leaching at atmospheric pressure with air and aqueous sulfuric acid or by a pressure hydrothermal leaching in the presence of oxygen and aqueous sulfuric acid to selectively dissolve the copper and tellurium content from the slimes. The resulting leach liquids are filtered and the copper and tellurium-containing filtrate is treated so as to separate the copper and tellurium values therefrom. The filtered solids leach residue comprising a substantial amount of selenium, such as about 15–50% by weight, more or less, or, as indicated in FIG. 1, an amount in the range 15–30% by weight, is dried to a suitable moisture content. A minor amount of a pelletizing agent, such as clayey material, e.g. bentonite, or other suitable material useful as a binding agent in the practice of the subject invention is then added to the selenium-containing residue.

The resulting admixture of the dried, substantially decopperized selenium-containing slimes and binding or pelletizing agent, such as bentonite, is mulled or mixed and pelletized. The pelletized selenium-containing slimes are then introduced to the reactor or roaster. The pelletized selenium-containing slimes are introduced into the reactor or roaster to form a static mass therein, such as a mass of pelletized selenium-containing slime having a uniform bed thickness in the range from about 12 to about 36 inches, more or less. Heated air, such as may be obtained by the combustion of a hydrocarbon fuel, e.g. a normally gaseous hydrocarbon fuel, such as propane, in the presence of an excess of air, is passed through the static mass of pelletized selenium-containing slimes. Desirably, the heated air or hot oxygen-containing gas is passed downwardly through the static mass of pelletized selenium-containing slimes. The pelletized selenium-containing slimes are thereby heated to a temperature sufficient to volatilize the selenium content therefrom as selenium dioxide. Any suitable elevated temperature effective to volatilize the selenium content from the pelletized selenium-containing slimes may be employed. A temperature of 1350° F. has been found to be suitable. A higher temperature up to about 1500° F., more or less, is useful provided the fusion point of the pelletized selenium-containing slimes in the mass of pelletized selenium-containing slimes undergoing treatment is not reached so as to avoid fusing the mass of pelletized selenium-containing slimes within the roaster. A lower temperature, such as a temperature in the range 1200–1325° F., may be employed but a longer time would then be required to substantially deselenize the mass of pelletized selenium-containing slimes.

The mass of pelletized selenium-containing slimes is maintained static within the roaster and the hot air or oxygen-containing gas is passed therethrough, preferably downwardly, until substantially all of the selenium content of the pelletized selenium-containing slimes has been volatilized therefrom in the form of selenium dioxide. When the mass of pelletized selenium-containing slimes has been substantially deselenized the mass of deselenized pelletized slimes is then discharged from the roaster for suitable treatment, if desired, for the recovery of any other remaining values therefrom.

As indicated in FIG. 1 the deselenized pelletized slimes containing generally less than about 5% by weight selenium, such as an amount of selenium in the range 0.5–5% by weight, is introduced into a dore furnace for the recovery of dore metal therefrom and a dore slag. In the dore furnace the remaining selenium is volatilized and can be introduced together with the volatilized selenium dioxide recovered from the roaster to a scrubber for eventual treatment in a selenium precipitator by contact with sulfur dioxide to precipitate elemental selenium.

After the mass of deselenized pelletized slimes has been discharged from the roaster another amount or mass or pelletized selenium-containing slimes is introduced thereinto for the recovery of the selenium therefrom.

In accordance with a special embodiment of the practice of this invention indicated in FIG. 1 of the drawing roasted, deselenized pellets are recycled, i.e. blended or otherwise homogeneously admixed with fresh selenium-containing pellets from the pelletizer and supplied to the roaster or reactor. The amount of recycled roasted deselenized pellets may comprise about 10–50% by weight of the materials charged to the reactor. By recycling deselenized roasted pellets to the reactor a more permeable mass or bed therein is obtainable and the deselenized roasted pellets tend to prevent collapse and fusion of the bed or mass of pellets within the roaster. The presence of deselenized roasted pellets in the mass of pellets within the roaster permits the treatment of deep beds of pellets. For example, a charge containing about 10% by weight roasted deselenized pellets allows a bed depth of about 24 inches within the roaster without undue danger of collapsing or fusing the bed during roasting. A charge containing about 50% by weight roasted deselenized pellets permits a bed thickness of about 36 inches in the reactor.

Reference is now made to FIGS. 2 and 3 of the drawings which illustrate an apparatus suitable in accordance with an embodiment of this invention for the recovery of selenium values in the form of selenium dioxide from pelletized decopperized selenium-containing tank house slimes. Air preheater 10 is provided with burner 11 suitable for the combustion of a hydrocarbon fuel or the equivalent, such as natural gas, propane, or a light fuel oil. Burner 11 is supplied with fuel and a suitable amount of air, preferably an amount of air in excess of the amount required to effect complete combustion of the fuel, via line 12. An additional amount of air is supplied to air preheater 10 via line 14. The total amount of air supplied to air preheater 10 via lines 14 and 12 is substantially in excess of the amount of air required to effect complete combustion of the hydrocarbon fuel in burner 11.

The resulting heated air moved from the top of air preheater 10 via conduit or flue 15 into a roaster generally indicated by reference numeral 16. Roaster 16 includes a top portion or cover 17 which is provided with an opening 17a and a door 17b adapted to cover opening 17a. Door 17b is adapted to be moved or lifted from cover 17 by means of cables 18 actuated by suitable means, not shown, so as to uncover opening 17a and provide access to the interior of roaster 16.

Grates 20 are provided at the bottom of roaster 16 and are located at the bottom of central portion 19 thereof and are adapted, in the position illustrated, to support static permeable mass 21 of pelletized decopperized anode slimes.

Grates 20 are pivotally mounted at the bottom of roaster 16 for a swinging downward movement on bars 23 which are operatively fixed to yoke 22 by arms 24. Yoke 22 is in turn fixed to piston rod 25 which is actuated hydraulically or pneumatically by cylinder 26 so as to move yoke 22 downwardly or upwardly. When yoke 22 is moved upwardly by piston rod 25 grates 20 are closed to support a mass of pelletized slimes thereon. When yoke 22 is moved downwardly grates 20 are swung downwardly to open and to discharge any pelletized slimes from within roaster 16 into discharge zone 28 located directly beneath grates 20.

Discharge zone 28 is provided with opening 28a in the side wall thereof for the exit of the hot air supplied to roaster 16 from air preheater 10 via conduit 15 and the volatilized selenium values, i.e. volatilized selenium dioxide, derived from the pelletized slimes being roasted within roaster 16. The hot gases and volatilized selenium dioxide moves through opening 28a of discharge zone 28 into flue 29 for treatment and eventual recovery in accordance with this invention. Flue 29, as illustrated, is provided with a bottom cleanout section 29a for the collection and removal of some of the solids and dusts which may be transported from discharge zone 28 through opening 28a into flue 29 by the hot air.

The bottom portion of discharge zone 28 is provided with opening 30 covered by door 31 which is adapted to be moved away from opening 30 by means not illustrated to permit the discharge of any solids material dumped from roaster 16 and collected in the bottom of discharge zone 28. As illustrated in the drawings air preheater 10 and roaster 16 together with discharge zone 28 and the associated appurtenances including hydraulically or pneumatically actuated cylinders 26 are carried on suitable supporting structures 32.

In operation, the pelletized selenium-containing material is loaded through charging opening 17a into roaster 16 onto grates 20 and door 17b lowered to cover opening 17a. Burner 11 is lit and air under pressure from a blower, not shown, is admitted into air preheater 10 via conduit 14. Air is also introduced into air preheater 10 via conduit 12 together with the fuel supply. The amount of air admitted to air preheater 10 is suitably metered and the temperature of the hot oxidizing gases within air preheater 10 is initially controlled by thermocouple 11a operatively connected to burner 11 and the air supplied thereto. Another thermocouple 19a embedded in mass 21 of the pelletized selenium-containing material serves to hold mass 21 at a desired temperature or temperature range.

Pressure regulator 15a is operatively connected to a blower supplying air to air preheater 10 via conduit 14 and/or conduit 12 to regulate the pressure within roaster 16. During initial operation it is advisable to bypass some heated air from preheater 10 via bypass conduit 34 which is provided with damper 34a into bottom portion of discharge zone 28 of roaster 16 to oxidize the selenium which is usually emitted in elemental form at the start up of the roaster operation. If desired, a timing mechanism may be used to cut off the flow of hot gases from air preheater 10 into discharge zone 28 of roaster 16 via bypass conduit 34 after a predetermined time interval. The hot gases containing the selenium values exit roaster 16 via opening 28a in discharge zone 28.

Hot air is passed through the mass of pelletized selenium-containing material within roaster 16 until substantially all of the selenium values therein have been removed in the form of selenium dioxide. The resulting volatilized selenium dioxide leaves roaster 16 via discharge zone 28 and opening 28a and the flue 29 for eventual recovery by means of a water scrubber, not shown, or other suitable means. After substantially all of the selenium values have been volatilized from the mass 22 of pelletized selenium-containing material, the mass of the deselenized pellets is discharged by opening grates 20. The deselenized pellets then drop into discharge zone 28 of roaster 16. Thereupon, by opening bottom door 31 the deselenized pellets can be removed into a suitable collecting means.

Advantages of the apparatus and process of this invention reside in the fact that the roaster need not be configured to any particular or critical shape and the space requirements for the overall apparatus in operation are relatively small. Further, this invention permits the utilization of the exothermic heat of oxidation to deselenize the pelletized slimes. Another advantage is the fact that practically all of the equipment except for the alloy grating bars may be lined with insulating and/or refractory brick so that equipment maintenance costs are very low. Usually it is advisable to line all equipment operating in the 1000–1500° F. range with insulating brick or the like. The apparatus and process of the invention have the ability to deselenize a mass of pelletized selenium-containing material having a substantial depth without the formation of fused agglomerates.

The following example is illustrative of the practice of this invention:

EXAMPLE

A batch of 2000 pounds of decopperized selenium-containing slimes from the electrolytic refining of copper containing 18% by weight selenium was combined with 160 pounds of bentonite and the mixture was pulverized thoroughly in a milling muller. The mulled mixture was agglomerated in a pelletizer to form pellets of a ¼″–¾″ diameter. The moisture content of the pellets was 9%.

The pellets were charged into roaster 16 through door 17b onto the grates 20 to a depth of 18 inches. The charging door 17b was sealed and the burner 11 was lit with thermocouple 11a set at 1200° F. Propane was burned in burner 11. The oxidizing air was metered through conduit 14 so that the superficial gas velocity through the bed of pelletized slimes within roaster 16 at ambient conditions was about 100 f.p.m. The pressure as measured at pressure tap 15a was 8 inches of water. Some hot oxygen-containing gases were bypassed from air preheater 10 via conduit 34 into discharge zone 28 of roaster 16 to oxidize into selenium dioxide some of the elemental selenium which was volatilized from the pellets at the start of the roasting operation.

After one-half hour the controlling thermocouple was switched from thermocouple 11a to thermocouple 19a, thermocouple 19a being placed some three inches deep in the bed of pellets. The set point of the control thermocouple 19a was set at 1350° F. for the regulation of B.t.u. input of burner 11.

After 4½ hours, burner 11 was shut off but air was moved through preheater 10 to cool the roasted pellets. After ½ hour the flow of cooling air was turned off and grates 20 opened. Then discharge door 31 was opened to discharge the deselenized pellets.

There were no fused agglomerates in the deselenized roasted pellets. The average selenium content was sufficiently low to permit smelting the product to dore metal without difficulty in a dore furnace. The calculated degree of selenium elimination was 87%.

As will be apparent to those skilled in the art in the light of the foregoing disclosure, many modifications, alterations and substitutions are possible in the practice of this invention without departing from the spirit or scope thereof.

What is claimed is:

1. A method of deselenizing and recovering selenium values from decopperized selenium-containing material, such as copper anode slimes, muds, sludges and dusts which comprises pelletizing said decopperized selenium-containing material, forming a mass containing said pelletized selenium-containing material within a roasting zone, said mass having a substantially uniform depth within said roasting zone, said depth being in the range from about 12″ to about 36″ and said mass of said pelletized selenium-containing material also containing 10–50% by weight recycled deselenized pelletized selenium-containing material, moving heated air or oxygen-containing gas through said mass within said roasting zone while maintaining said mass static relative to said roasting zone to heat said mass to an elevated temperature in the range 1200–1500° F. effective to volatilize selenium therefrom but below the fusion temperature of said mass of pelletized material, continuing passing heated air or oxygen-containing gas through said static mass of pelletized material and maintaining said mass of pelletized material static within said roasting zone and within the aforesaid temperature range for a period of time to volatilize substantially all of the selenium from said pelletized selenium-containing material therein and recovering the resulting volatilized selenium.

2. A method in accordance with claim 1 wherein said selenium-containing material has bentonite admixed therewith during the pelletizing operation.

3. A method in accordance with claim 1 wherein said selenium-containing material is decopperized anode slimes containing about 10–30% by weight selenium.

4. A method in accordance with claim 1 wherein said static mass of pelletized material within said roasting zone is maintained at an elevated temperature of about 1350° F.

5. A method in accordance with claim 1 wherein said heated air or oxygen-containing gas is moved downwardly through said mass of pelletized selenium-containing material within said roasting zone.

References Cited

UNITED STATES PATENTS

| 2,775,509 | 12/1956 | Lebedeff et al. | 23—39 |
| 2,948,591 | 8/1960 | Handwerk et al. | 23—39 |
| 2,981,603 | 4/1961 | Tuwiner | 23—209 |

HERBERT T. CARTER, Primary Examiner

U.S. Cl. X.R.

23—284, 209